(12) United States Patent
Morein et al.

(10) Patent No.: US 9,501,184 B2
(45) Date of Patent: Nov. 22, 2016

(54) TRANSCAPACITIVE SENSOR HAVING GATE LINES USED FOR BOTH DISPLAY UPDATING AND CAPACITIVE SENSING

(71) Applicant: Synaptics Incorporated, San Jose, CA (US)

(72) Inventors: Stephen L. Morein, San Jose, CA (US); Petr Shepelev, San Jose, CA (US); Joseph Kurth Reynolds, Alviso, CA (US); Jeffrey Lukanc, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 231 days.

(21) Appl. No.: 14/137,481

(22) Filed: Dec. 20, 2013

(65) Prior Publication Data

US 2015/0177869 A1 Jun. 25, 2015

(51) Int. Cl.
*G06F 3/044* (2006.01)
*G06F 3/041* (2006.01)

(52) U.S. Cl.
CPC ............. *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2009/0201259 A1* | 8/2009 | Nurmi | G06F 3/0412 345/173 |
| 2010/0253638 A1* | 10/2010 | Yousefpor | G06F 3/0416 345/173 |
| 2011/0169747 A1* | 7/2011 | Chen | G06F 3/0412 345/173 |
| 2014/0111446 A1* | 4/2014 | Lee | G06F 3/0416 345/173 |
| 2014/0146246 A1* | 5/2014 | Ma | G06F 3/0412 349/12 |
| 2014/0160066 A1* | 6/2014 | Kim | G06F 3/0412 345/174 |
| 2014/0168149 A1* | 6/2014 | Han | G06F 3/0412 345/174 |
| 2014/0354586 A1* | 12/2014 | Yousefpor | G06F 3/044 345/174 |
| 2015/0049041 A1* | 2/2015 | Yousefpor | G06F 3/0412 345/174 |

\* cited by examiner

*Primary Examiner* — Ryan A Lubit
(74) *Attorney, Agent, or Firm* — Patterson + Sheridan, LLP (57) ABSTRACT

Capacitive sensing is performed in an input device having an input sensor and associated display device using gate lines of the display device. A transmitter signal having a negative pulse is used to safely transmit a transcapacitive transmitter signal while not opening any of the access transistors in the display device.

23 Claims, 4 Drawing Sheets

TRANSCAPACITIVE SENSOR HAVING GATE LINES USED FOR BOTH DISPLAY UPDATING AND CAPACITIVE SENSING

FIELD

Embodiments of the present disclosure relate to an input device, processing system, and method for capacitive sensing using display elements.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE DISCLOSURE

An input device, processing system for an input device, and method for operating capacitive sensors are disclosed herein. In one embodiment, an input device having a display device and an integrated sensing device includes a plurality of transmitter electrodes including a first transmitter electrode. Each transmitter electrode may include one or more gate lines of the display device, wherein the gate lines are configured for display updating and capacitive sensing. The input device further includes a plurality of receiver electrodes, and a processing system coupled to the plurality of transmitter electrodes and to the plurality of receiver electrodes. The processing system is configured to drive a transmitter signal with the first transmitter electrode for capacitive sensing, and receive resulting signals with the plurality of receiver electrodes, the resulting signals comprising effects corresponding to the transmitter signal. The transmitter signal may include a maximum amplitude that is below a display update turn-on voltage for the plurality of gate lines.

In another embodiment, a processing system configured to drive an input device comprising a display device comprising an integrated sensing device. The processing system includes a transmitter module configured to be coupled to a plurality of transmitter electrodes. Each transmitter electrode includes one or more gate lines of the display device, wherein the gate lines are configured for display updating and capacitive sensing. The transmitter module is configured to drive a transmitter signal with the first transmitter electrode for capacitive sensing. The transmitter signal may include a maximum amplitude that is below a display update turn-on voltage for the plurality of gate lines. The processing system further includes a receiver module configured to be coupled to a plurality of receiver electrodes and configured to receive resulting signals with the plurality of receiver electrodes, the resulting signals comprising effects corresponding to the transmitter signal.

In another embodiment, a method for detecting presence of an input object using a capacitive sensing device. The method includes driving a transmitter signal with at least one of a plurality of transmitter electrodes. Each transmitter electrode includes one or more gate lines of the display device, wherein the gate lines are configured for display updating and capacitive sensing. The transmitter signal may have a maximum amplitude that is below a display update turn-on voltage for the plurality of gate lines. The method further includes receiving resulting signals with a plurality of receiver electrodes, the resulting signals comprising effects corresponding to the transmitter signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the present disclosure provide input devices and methods for re-using existing layers in a display screen (e.g., LCD) to perform input sensing. Known approaches use a layer of conductive electrodes in the display screen, sometimes referred to as common electrodes, or a $V_{COM}$ layer, as transmitter electrodes. However, such approaches require that the $V_{COM}$ layer be time interleaved between its display function and its use as a capacitive sensing layer.

According to embodiments of the present disclosure, to perform input sensing while simultaneously allowing display updates, the input device may use conductive electrodes, referred to as gate lines, within the thin-film-transistor layer of the display screen for capacitive sensing. In one embodiment, the input device drives a negative pulse, rather than a positive pulse, on the gate lines to transmit a transcapacitive transmitter signal that does not open any of the access transistors of the display screen. The waveform of the transmitter signal may be selected to reduce display artifacts that may arise from driving the gate lines for input sensing. Further, gate lines found at the edge of a particular transmit region may be driven to prevent access transistors from turning on due to charge sharing.

Figure 1:
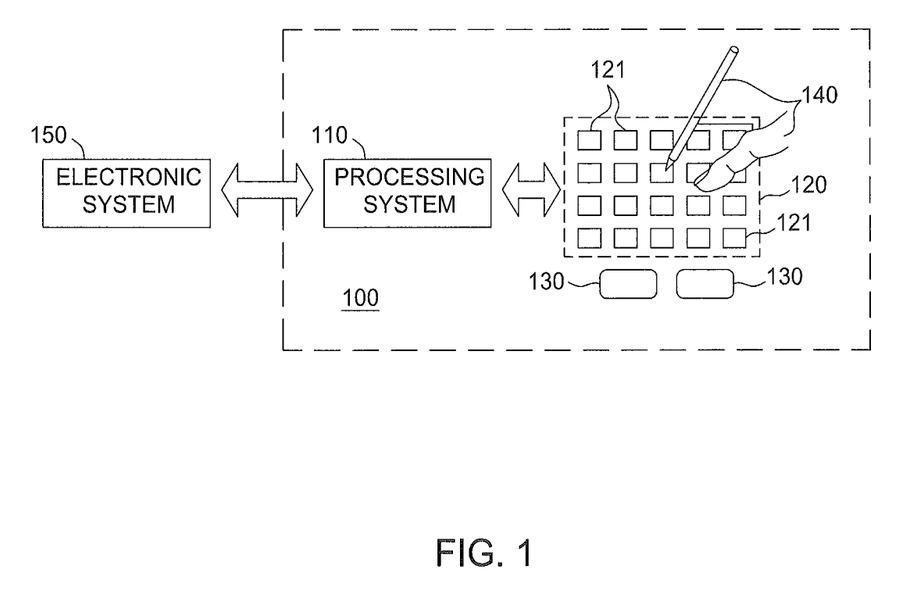
FIG. 1 is a schematic diagram of an exemplary input device, in accordance with embodiments of the disclosure.

FIG. 1 is a block diagram of an exemplary input device 100, in accordance with embodiments of the present disclosure. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems 150 include personal computers of all sizes and shapes, such as desktop computers, laptop computers, netbook computers, tablets, web browsers, e-book readers, and personal digital assistants (PDAs). Additional example electronic systems 150 include composite input devices, such as physical keyboards that include input device 100 and separate joysticks or key switches. Further example electronic systems 150 include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to one or more capacitive sensing elements 121 to create an electric field between an electrode and ground. Nearby input objects 140 cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

In FIG. 1, the processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the user input (or lack of user input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device may share physical elements. For example, some embodiments may utilize some of the same electrical components for displaying and sensing. As another example, the display device may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
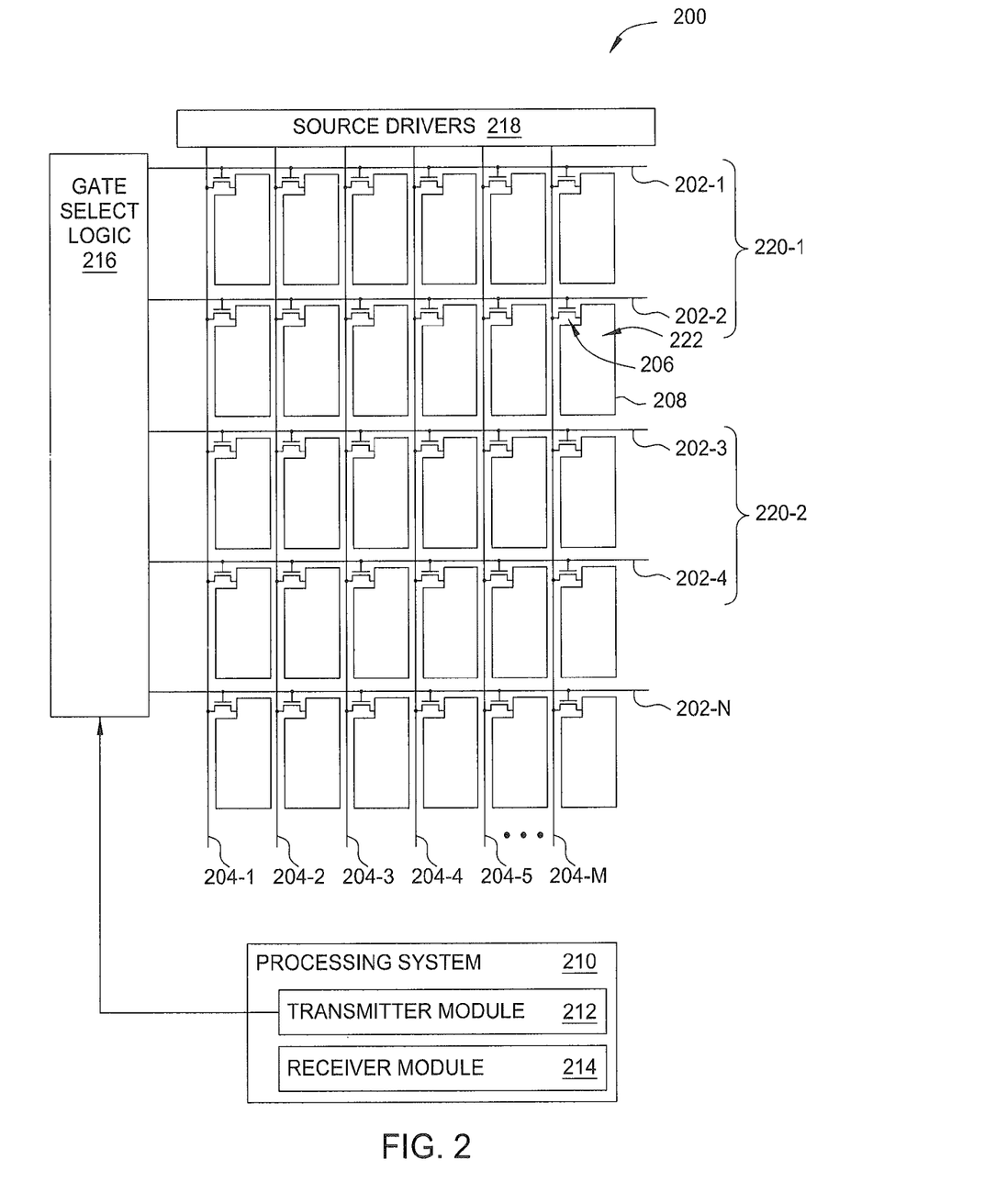
FIG. 2 illustrates the input device in greater detail, including systems for updating pixels in an associated display screen, according to one embodiment of the disclosure.

FIG. 2 shows in greater detail the input device 100 including an example pattern of sensing elements 121 configured to sense in a sensing region 120 associated with the pattern. The illustrated pattern of sensing elements 121 include a plurality of transmitter electrodes 220 (220-1, 220-2) which comprise one or more conductive electrodes referred to as gate lines 202 (202-1, 202-2, 202-3, 202-4, etc.) disposed on a thin-film-transistor (TFT) layer 200 of the display device.

According to one embodiment, the gate lines 202 are part of a system for updating a plurality of pixels 222 in the display device. Gate select logic 216, also referred to as row select logic, may select one of the rows of pixels 222 by activating respective access transistors 206 in the pixels 222 via the gate lines 202. Access transistors 206 have a characteristic threshold voltage and are activated when the gate of the access transistors 206 is driven with a turn-on voltage above the characteristic threshold voltage. For example, access transistors 206 of the display device may have a characteristic threshold voltage of 4V, although other configurations may be utilized. When activated, the access transistors 206 of the pixels 222 enable a conductive path, through source lines 204 (204-1, 204-2, 204-3, 204-4, 204-5, 205-M), which source drivers 216 may drive a desired voltage across capacitors 208 of the pixels 222 (represented schematically by pixel electrodes). The voltage of the capacitors 208 may be defined by the voltage difference between the voltage on the source lines 204 and a reference voltage (e.g., V-com). The pixels 222 may be coupled to the reference voltage (e.g., V-com) via one or more conductive electrodes referred to as V-com electrodes (not shown). In some embodiments, the capacitance of capacitors 208 may be based on, at least in part, liquid crystal material used to set the color associated with the pixels 222.

The embodiments described herein are not limited to any particular display technology and may be used, for example, with LED (light emitting diode), OLED (organic light-emitting diode), CRT (cathode ray tube), plasma, EL (electroluminescent), or other display technology. Further, it should be recognized that, in some embodiments, pixels 222 may comprise a plurality of sub-pixels, for example, representing a red (R) sub-pixel, a green (G) sub-pixel, and a blue (B) sub-pixel of a single pixel having a RGB sub-pixel arrangement, although other types of sub-pixel arrangements may be used.

During display update operations, the gate select logic 216 may raster through the individual rows of the display screen until all the pixels 222 have been updated. For example, the gate select logic 216 may activate a single row of pixels 222 using an individual gate line 202-1. In response, the source drivers 216 may drive respective voltages onto the source lines 204 that generate a desired voltage (relative to the reference voltage) across the capacitors 208 in the selected row of pixels 222. The gate select logic 216 may then de-activate the previously selected row of pixels 222 and the source drivers 216 may be controlled, for example, by a display driver module of the processing system 110 such that the source drivers 216 provides the correct voltage for the pixels 222 as the gate select logic 216 activates each row of pixels 222 individually.

According to one embodiment, the processing system 110 is configured to actively drive a group of one or more gate lines 202 for capacitive sensing. In one embodiment, the processing system 110 is configured to drive one or more gate lines 202 with a transmitter signal for capacitive sensing while other gate lines 202 are being operated for display updating. In some embodiments, the transmitter signal may have a maximum amplitude that is below a display update turn-on voltage for the plurality of gate lines 202, as described later in conjunction with FIGS. 4A and 4B.

The gate select logic 216 may be external to the processing system 110 as shown in FIG. 2 (e.g., residing in either components communicatively coupled to the processing system 110 or directly on glass), or in other embodiments, may be internal to processing system 110.

In one embodiment, the processing system 110 is configured to operate the hardware of the input device 100 to detect input in the sensing region—e.g., some portion of the display screen. In the embodiment shown, the processing system 110 includes at least a transmitter module 212 and a receiver module 214 configured to be coupled to the plurality of transmitter electrodes 220 and to a plurality of receiver electrodes (not shown). The transmitter module 212 may include driver circuitry configured to be coupled to the gate lines 202 and configured to drive the gate lines 202 for capacitive sensing and for display updating. In some embodiments, the transmitter module 212 may be implemented as a capacitive sensing controller module communicatively coupled to a separate display driver controller, or as a single controller configured to provide both capacitive sensing and display updating.

In one embodiment, the receiver module 214 is configured to be coupled to a plurality of receiver electrodes. The receiver module 214 is configured to receive resulting signals from the plurality of receiver electrodes when performing capacitive sensing within the sensing region 120. In one embodiment, the processing system 110 is further configured to determine positional information based on resulting signals. In some embodiments, the processing system 110 may be configured to generate an indication of object presence in the sensing region 120 based on resulting signals received by the receiver electrodes. In some embodiments, the plurality of receiver electrodes may be sensor electrodes arranged on a separate layer as the TFT layer 200 of the display device. In other embodiments, the plurality of receiver electrodes may comprise the source lines 204 of the display device.

Figure 3:
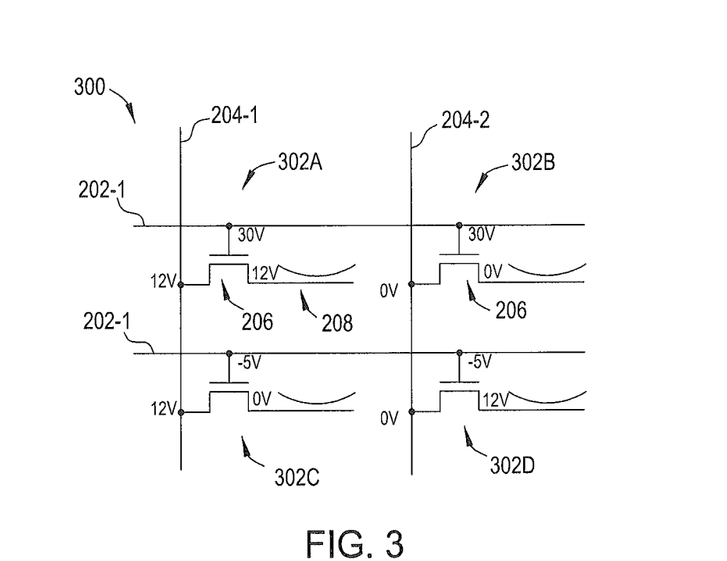
FIG. 3 depicts various states for an access transistor of an example input device having an integrating display device.

FIG. 3 depicts various states for an access transistor of an example input device 300 having an integrating display device. For sake of example, the example input device 300 is configured to use a pixel voltage between 0V and 12V, and the access transistors 206 of the example input device 300 have a characteristic threshold voltage of 4V. To illustrate the various states for an access transistor 206 in pixels 302A, 302B, 302C, and 302D, it may be assumed that the left source line 204-1 is driven to 12V, and the right source line 204-2 is driven to 0V. Further, the top gate line 202-1 is on, using a voltage of 30V, so that the voltage of the capacitors 208 of the pixels 302A and 302B is the same as the voltage on the source lines 204-1 and 204-2, respectively. The bottom gate line 202-2 is off, using a voltage of −5V. As such, to effectively drive gate lines for capacitive sensing, it may be desirable to preserve the voltage on the pixel capacitors 208 in pixels 302C and 302D (i.e., leave pixels 302C and 302D undisturbed).

In the "on" states illustrated by the pixels 302A and 302B, it has been determined that oxide of the access transistors 206 may be stressed most in the case of pixel 302B, having a 30V differential across it (i.e., 30V at gate to 0V at source). In the "off" states illustrates by the pixels 302C and 302D, it has been determined that oxide of the access transistor 206 may be stressed most in the case of pixel 302D with a 17V differential across it (i.e., −5V at gate to 12V at the drain, or pixel capacitor 208). It has been further determined that, if the gate line were to rise, sub-threshold voltage in pixels 302B and 302D would cause the some of the capacitive charge to leak out of the pixel capacitor 208. Similarly, it has been determined that capacitive charge may leak out of the pixel capacitor 208 of the pixel 302C if capacitive coupling were to drive the pixel capacitor 208 negative.

Accordingly, as illustrated in FIG. 3, it has been determined that driving a positive transmitter signal on a gate line would cause charge to leak from pixel capacitors 208. Accordingly, embodiments of the present disclosure include a mechanism for driving a negative signal, which would only more strongly turn off a gate. Further, assuming the mechanism for driving a negative signal may not stress oxide of access transistors 206 more strongly than already stressed for display updating, it has been determined that a maximum stress may be 30V as shown in the access transistor of the pixel 302B. When applied to the case of the pixel 302D, it has been further determined that the mechanism for driving a negative signal may drive a gate line 202 as low as −18V (i.e., 12V−30V=−18V), which means a −13V signal (i.e., −18V−−5V) on the gate line without adversely affecting display updating operations.

Figure 4A:
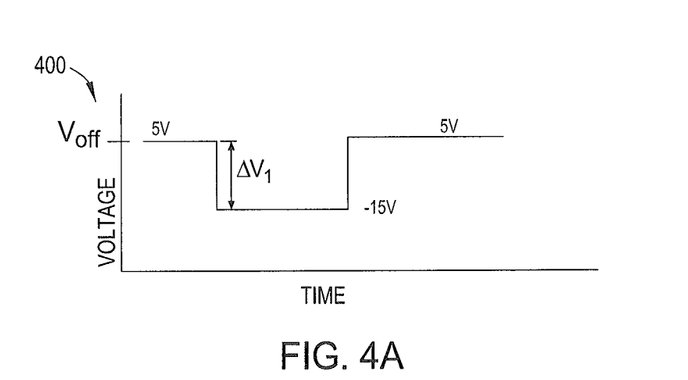
FIGS. 4A and 4B illustrate example waveforms that may be used to drive one or more gate lines for capacitive sensing, according to one embodiment of the present disclosure.
Figure 4B:
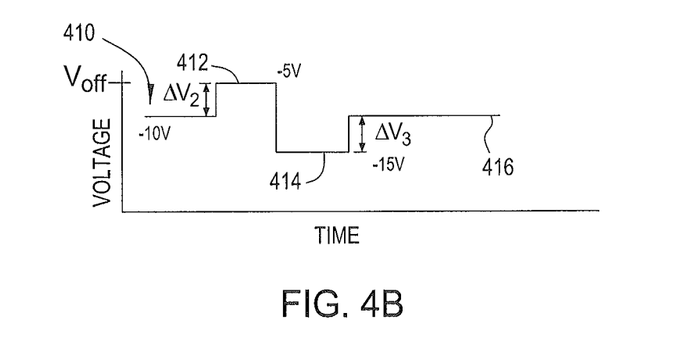

FIGS. 4A and 4B illustrate example waveforms that may be used to drive one or more gate lines for capacitive sensing, according to one embodiment of the present disclosure. In the embodiment shown in FIG. 4A, the processing system 110 may be configured to drive a transmitter signal 400 comprising a maximum amplitude (e.g., −5V) that is below a display update turn-on voltage of the plurality of gate lines. In one embodiment, the transmitter signal 400 comprises a negative pulse (e.g., −15V) having an amplitude (e.g., $\Delta V_1$) that is below the display update turn-on voltage of the gate lines 202.

FIG. 5B illustrates an alternative embodiment of a transmitter signal 410 that may be used to drive gate lines 202 for capacitive sensing. It has been determined that, in some cases, when driving a transmitting signal (e.g., signal 400) on gate lines for capacitive sensing, the pixel capacitors 208 may be capacitive coupled, temporarily causing the voltage across the pixel to be wrong. This may apply a bias to a portion of the display screen, resulting in an incorrect color. In one embodiment, the processing system 110 may be configured to apply a voltage level 416 corresponding to an off state, which is lower than a conventional off state (e.g., from −5V to −10V). In some embodiments, the transmitter signal 410 includes a positive pulse 412 and a negative pulse 414 relative to the lowered voltage level 416. Accordingly, an averaging of the waveform 410 results in no DC bias to the pixel capacitors 208, and further helps settling time of other layers in the display device. In one embodiment, the lowered voltage level 416 may be selected to be lower than the characteristic threshold voltage of access transistors 206 in the display device by an amount (e.g., $\Delta V_2$) sufficient to allow a positive pulse to still be lower than the characteristic threshold voltage of the access transistors and/or lower than a conventional off state (i.e., −5V).

Figure 5:
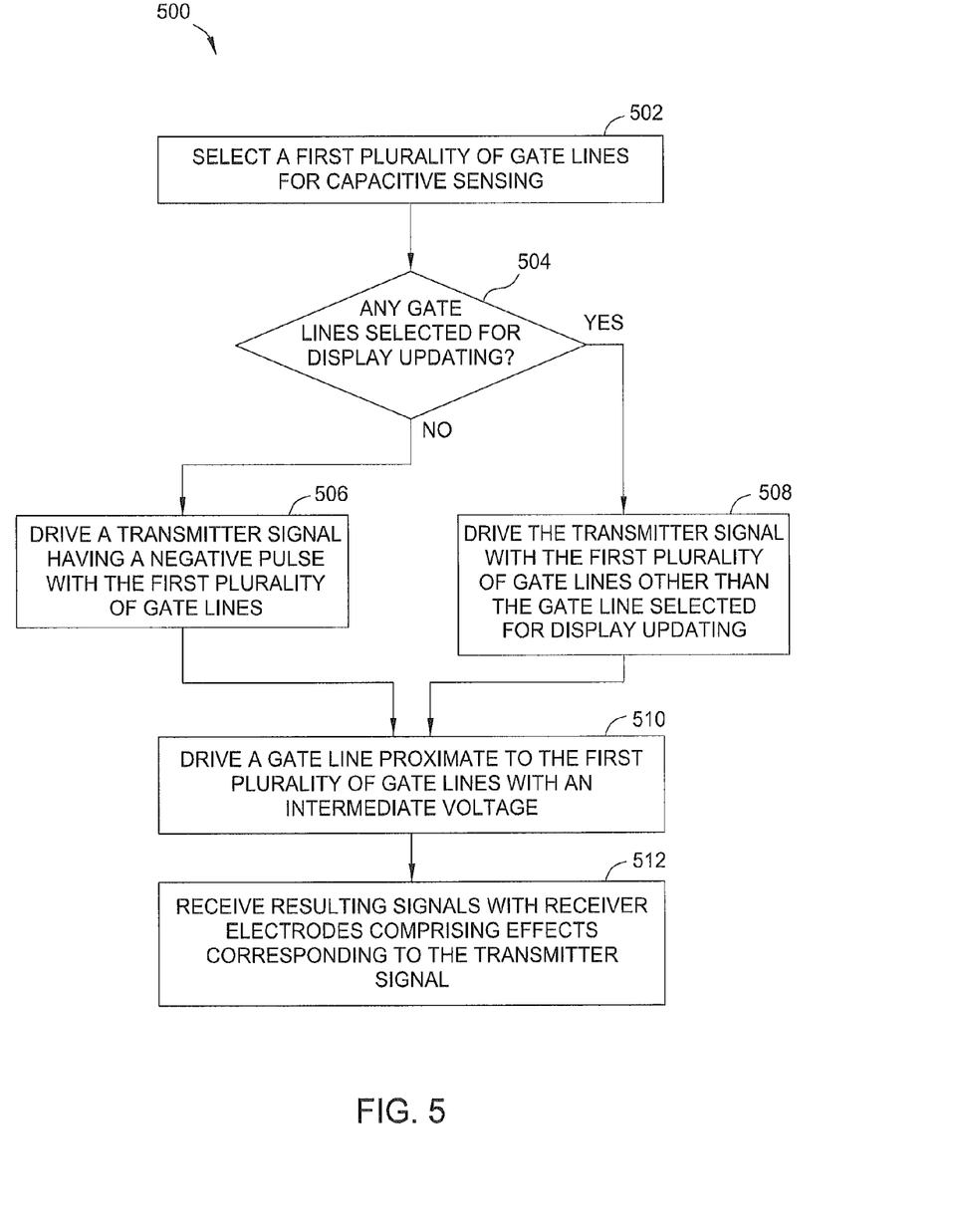
FIG. 5 is a flow diagram illustrating a method for operating an input device, according to one embodiment of the disclosure.

FIG. 5 is a flow diagram illustrating a method for operating an input device having an associated display device, according to one embodiment of the disclosure. In the embodiment shown, at step 502, the processing system 110 of the input device 100 selects a first plurality of gate lines 202 that comprise a transmitter electrode 220 for capacitive sensing.

In some embodiments, at step 504, the processing system 110 may determine whether any of the first plurality of gate lines 202 have been selected for display updating. For example, in a HD (High Definition) touch screen device having 1080 gate lines grouped into 40 transmitter electrodes (i.e., 27 gate lines per transmitter electrode), some situations may arise in which the transmitter electrode selected to be driven overlaps with a line being stored (i.e., updated). Accordingly, at step 508, responsive to determining at least one of the gate lines 202 of the transmitter electrode has been selected for display updating, the processing system 110 drives the transmitter signal with the first plurality of gate lines other than the gate line selected for display updating. In one embodiment, the processing system 110 may drive the gate line selected for display updating with a lowered turn-off voltage level which is lower than a characteristic threshold voltage of the access transistors of the display device.

At step 506, responsive to determining none of the gates lines that comprise the transmitter electrode are selected for display updating, the processing system 110 drives a transmitter signal having a negative pulse with the first plurality of gate lines. In some embodiments, the transmitter signal may have a maximum amplitude that is below a display update turn-on voltage for the plurality of gate lines. In some embodiments, the transmitter signal may include a negative pulse relative to a system reference voltage of the display device. In some embodiments, the transmitter signal may include a pulse having a first position portion relative to a lowered turn-off voltage level of the gate lines and a negative portion relative to the lowered turn-off voltage level of the gate lines (as depicted in FIG. 4B).

It has been determined that, in some cases, access transistors 206 coupled to gate lines 202 at the edge of a group of gate lines (i.e., that comprise a transmitter electrode 220) may inadvertently open due to charge sharing. As such, in one embodiment, at step 510, the processing system 110 drives a gate line proximate to the first plurality of gate lines with an intermediate voltage. For example, if the gate off signal is −5V, the processing system 110 may drive the first gate line above the transmitter block from −5V to an intermediate voltage of −10V to ensure stability. In another embodiment, the processing system 110 may drive a gate line proximate to the first plurality of gate lines with a lowered turn-off voltage.

At step 512, the receiver module of the processing system 110 receives a resulting signal from at least one of the receiver electrodes. The processing system 110 may generate an indication of an object presence in the sensing region 120 based on the resulting signal.

While the foregoing is directed to embodiments of the present disclosure, other and further embodiments of the disclosure may be devised without departing from the basic scope thereof, and the scope thereof is determined by the claims that follow.

We claim:

1. An input device comprising a display device comprising an integrated sensing device:
    a plurality of transmitter electrodes including a first transmitter electrode, the plurality of transmitter electrodes operable to be driven for both capacitive sensing and display updating, wherein each transmitter electrode of the plurality of transmitter electrodes comprises one or more gate lines of the display device, wherein the gate lines are configured for display updating and capacitive sensing;
    a plurality of receiver electrodes; and
    a processing system coupled to the plurality of transmitter electrodes and to the plurality of receiver electrodes, and configured to:
        drive a transmitter signal on the first transmitter electrode that capacitively couples with the receiver electrodes for capacitive sensing, wherein the transmitter signal comprises a maximum amplitude that is below a display update turn-on voltage for the plurality of gate lines, and
        receive resulting signals with the plurality of receiver electrodes, the resulting signals comprising effects corresponding to the transmitter signal driven on the first transmitter electrode, the effects in the resulting signal indicative of presence of an input object in a sensing region of the input device.

2. The input device of claim 1, wherein the processing system is further configured to drive the transmitter signal with the first transmitter electrode comprising a first gate line for capacitive sensing, while driving a second gate line of the display device for display updating.

3. The input device of claim 1, wherein the processing system is further configured to:
    responsive to determining that a first gate line of the first transmitter electrode that is to be driven for capacitive sensing is selected for display updating, driving the transmitter signal on the gate lines of first transmitter electrode other than the first gate line.

4. The input device of claim 1, wherein the plurality of receiver electrodes comprise source lines of the display device.

5. The input device of claim 1, wherein the transmitter signal comprises a negative pulse relative to a system reference voltage of the display device.

6. The input device of claim 1, wherein the gate lines of the display device are coupled to a plurality of transistors having a characteristic threshold voltage, wherein the gate lines are configured to be driven to a lowered turn-off voltage level lower than the characteristic threshold voltage, and
    wherein the transmitter signal comprises a pulse having a first portion which is positive relative to the lowered turn-off voltage level of the gate lines and a second portion which is negative relative to the lowered turn-off voltage level of the gate lines.

7. The input device of claim 1, wherein the processing system is further configured to:
    drive a gate line proximate to the gate lines comprising the first transmitter electrode with an intermediary voltage above the transmitter signal and below the display update turn-on voltage.

8. The input device of claim 1, wherein the processing system is further configured to:
    drive a gate line proximate to the gate lines comprising the first transmitter electrode with an intermediary voltage selected to prevent capacitive coupling to adjacent electrodes that turn on adjacent access transistors.

9. A processing system configured to drive an input device comprising a display device comprising an integrated sensing device, the processing system comprising:
    a transmitter module configured to be coupled to a plurality of transmitter electrodes, the plurality of transmitter electrodes operable to be driven for both capacitive sensing and display updating, wherein each transmitter electrode of the plurality of transmitter electrodes comprises one or more gate lines of the display device, wherein the gate lines are configured for display updating and capacitive sensing, wherein the transmitter module is configured to drive a transmitter signal on the first transmitter electrode that capacitively couples with at least one receiver electrode of a plurality of receiver electrodes for capacitive sensing, wherein the transmitter signal comprises a maximum amplitude that is below a display update turn-on voltage for the plurality of gate lines; and
    a receiver module configured to be coupled to the plurality of receiver electrodes and configured to receive resulting signals with the plurality of receiver electrodes, the resulting signals comprising effects corresponding to the transmitter signal driven on the first transmitter electrode, the effects in the resulting signal indicative of presence of an input object in a sensing region of the input device.

10. The processing system of claim 9, wherein the processing system is further configured to drive the transmitter signal with the first transmitter electrode comprising a first gate line for capacitive sensing, while driving a second gate line of the display device for display updating.

11. The processing system of claim 9, wherein the processing system is further configured to:
    responsive to determining that a first gate line of the first transmitter electrode that is to be driven for capacitive sensing is selected for display updating, driving the transmitter signal on the gate lines of first transmitter electrode other than the first gate line.

12. The processing system of claim 9, wherein the transmitter signal comprises a negative pulse relative to a system reference voltage of the display device.

13. The processing system of claim 9, wherein the gate lines of the display device are coupled to a plurality of transistors having a characteristic threshold voltage, wherein the gate lines are configured to be driven to a lowered turn-off voltage level lower than the characteristic threshold voltage, and
    wherein the transmitter signal comprises a pulse having a first portion which is positive relative to the lowered turn-off voltage level of the gate lines and a second portion which is negative relative to the lowered turn-off voltage level of the gate lines.

14. The processing system of claim 9, wherein the processing system is further configured to:
drive a gate line proximate to the gate lines comprising the first transmitter electrode with an intermediary voltage above the transmitter signal and below the display update turn-on voltage.

15. The processing system of claim 9, wherein the processing system is further configured to:
drive a gate line proximate to the gate lines comprising the first transmitter electrode with an intermediary voltage selected to prevent capacitive coupling to adjacent electrodes that turn on adjacent access transistors.

16. A method for detecting presence of an input object using a capacitive sensing device, the method comprising:
driving a transmitter signal on at least one of a plurality of transmitter electrodes, the plurality of transmitter electrodes operable to be driven for both capacitive sensing and display updating, wherein each transmitter electrode of the plurality of transmitter electrodes comprises one or more gate lines of the display device, wherein the gate lines are configured for display updating and capacitive sensing, wherein the transmitter signal comprises a maximum amplitude that is below a display update turn-on voltage for the plurality of gate lines; and
receiving resulting signals with a plurality of receiver electrodes, the resulting signals comprising effects corresponding to the transmitter signal driven on the transmitter electrodes, the effects in the resulting signal indicative of presence of an input object in a sensing region of the input device.

17. The method of claim 16, wherein the driving the transmitter signal further comprises:
driving the transmitter signal with the first transmitter electrode comprising a first gate line for capacitive sensing, while driving a second gate line of the display device for display updating.

18. The method of claim 16, further comprising:
responsive to determining that a first gate line of the first transmitter electrode that is to be driven for capacitive sensing is selected for display updating, driving the transmitter signal on the gate lines of first transmitter electrode other than the first gate line.

19. The method of claim 16, wherein the plurality of receiver electrodes comprise source lines of the display device.

20. The method of claim 16, wherein the transmitter signal comprises a negative pulse relative to a system reference voltage of the display device.

21. The method of claim 16, wherein the gate lines of the display device are coupled to a plurality of transistors having a characteristic threshold voltage, wherein the gate lines are configured to be driven to a lowered turn-off voltage level lower than the characteristic threshold voltage, and
wherein the transmitter signal comprises a pulse having a first portion which is positive relative to the lowered turn-off voltage level of the gate lines and a second portion which is negative relative to the lowered turn-off voltage level of the gate lines.

22. The method of claim 16, further comprising:
driving a gate line proximate to the gate lines comprising the first transmitter electrode with an intermediary voltage above the transmitter signal and below the display update turn-on voltage.

23. The method of claim 16, further comprising:
driving a gate line proximate to the gate lines comprising the first transmitter electrode with an intermediary voltage selected to prevent capacitive coupling to adjacent electrodes that turn on adjacent access transistors.

* * * * *